WITNESSES:
John G. Chopp
James F. Young

INVENTORS
Roger R. Dougan, Francis T. Thompson
and Tibor Rubner
BY E. F. Possessky
ATTORNEY May 13, 1969 R. R. DOUGAN ETAL 3,444,324

TELEPHONE-COMPUTER-PROCESS FOR COMMUNICATING DATA AND TELEPHONE SIGNAL DECODER THEREFOR

Filed Dec. 23, 1965 Sheet 3 of 3

United States Patent Office 3,444,324

Patented May 13, 1969

3,444,324

TELEPHONE-COMPUTER-PROCESS FOR COMMUNICATING DATA AND TELEPHONE SIGNAL DECODER THEREFOR

Roger R. Dougan, Monroeville, Pitcairn, Francis T. Thompson, Penn Hill Township, Verona, and Tibor Rubner, Pittsburgh, Pa., assignors to Westinghouse Electric Corporation, Pittsburgh, Pa., a corporation of Pennsylvania Filed Dec. 23, 1965, Ser. No. 515,813

Int. Cl. H04m *11/00;* H04b *1/16;* H03g *3/30*

U.S. Cl. 179—2 5 Claims

ABSTRACT OF THE DISCLOSURE

A telephone-computer communications system includes decoding circuitry for distinguishing real telephone dial digit pulses from noise and false pulses. The circuitry includes an AGC amplifier and timing and logic circuitry which identifies the real pulses for inputting to the computer.

BACKGROUND OF THE INVENTION

The present invention relates to processes and systems for communicating data and more particularly to processes and systems for telephonically transmitting data to and from digital computers.

One of the aims of computer use economy is to make large computer data storage and processing capacity available on a broad scale to as many users as possible irrespective of their location in relation to the computer location. The user who has only periodic demand for large computer capacity can thus conveniently and relatively economically obtain computer service. Data communications and computer time sharing concepts are directed to fill this need, but conventional systems normally require the installation of special equipment at the user locations. Capital cost justification is therefore generally required before a particular user will install the remote equipment. Accordingly, an economic feasibility limitation is placed on users desiring the usual computer communication system although in many cases that limitation is less restrictive than the economic feasibility limitation connected with the installation of an on site computer. To make computer service widely available to organization users as well as individual users, it is therefore desirable that special user equipment at the user location be substantially or totally eliminated.

*Summary of the invention*

The present invention makes use of the conventional telephone network in providing computer data communications without special equipment on the user ends of the communication links. It is most useful where widely distributed and remote access is desired for a particular information system programmed in a digital computer and where moderate or small data processing needs exist at the individual remote locations. Accordingly, the present invention comprises a computer communicating process in which individual telephone subscribers make a standard phone connection to the computer terminal and subsequently send or request information by operating the phone digit or dial actuator. Information is transmitted according to a predetermined code and at the computer receiving station a unique decoding device responds to the characteristic telephone line signals to direct the coded information to the computer. Replies to inquiries are computer initiated through the phone line, as by an audio playback system audio coupled to a standard phone device at the computer installation.

It is therefore an object of the invention to provide a novel data communicating process which provides wider computer accessibility with improved economy.

Another object of the invention is to provide a novel data communicating process which allows computer access to individual telephone system subscribers substantially without any additional equipment at the user locations.

An additional object of the invention is to provide a novel data communicating process which provides for improved use economy of institutional and time lease commercial computer installations.

A further object of the invention is to provide a novel decoding unit having circuitry which establishes a communications linkage between the subscribers to a standard telephone network and a digital computer.

It is another object of the invention to provide a novel decoding unit for use in a telephone computer communications system which distinguishes between actual telephone digit signals and noise and other false signals in directing telephonically communicated data to the computer.

It is an additional object of the invention to provide a novel decoding unit for use in a telephone computer communications system which efficiently directs telephonically communicated data to the computer by compensating for variously characterized digit signals emanating from different user points in the telephone network.

These and other objects of the invention will become more apparent upon consideration of the following detailed description along with the attached drawings.

DESCRIPTION OF THE PREFERRED EMBODIMENT

Figure 1:
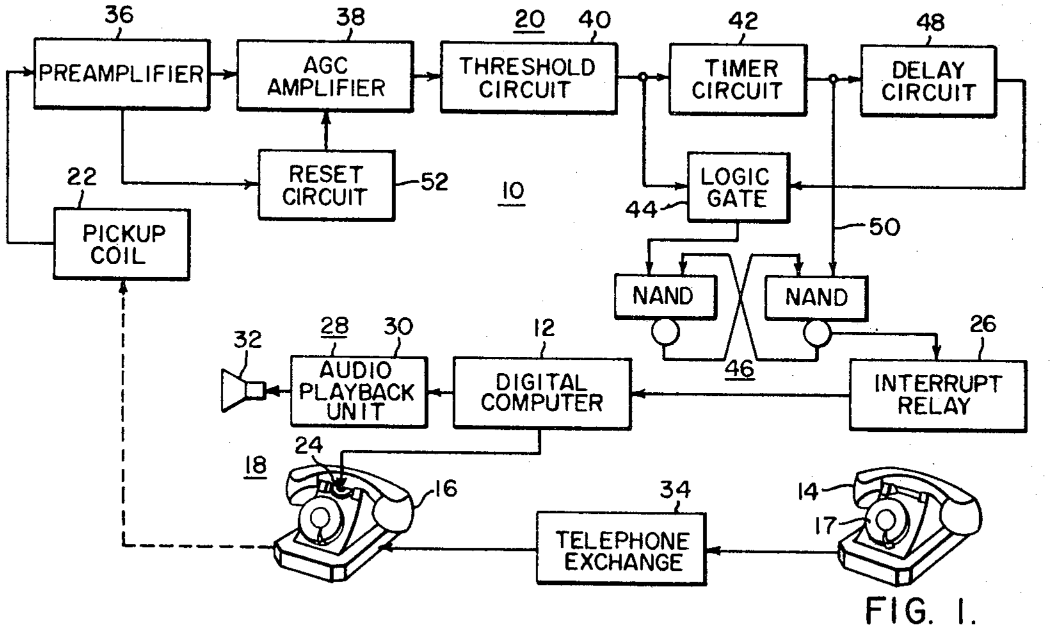
FIGURE 1 shows a schematic diagram of a telephone-computer data communications system arranged to operate in accordance with the principles of the invention.

More specifically, there is shown in FIGURE 1 a digital data communications system 10 which is operated in accordance with the principles of the invention. A centrally located digital computer 12 of suitable commercially available design is arranged to process data communicated between sending and receiving phones 14 and 16 in the existing telephone network.

The communicated data can relate to any predetermined information system which preferably is such as to operate with a relatively small amount of data in each communication for the convenience of the telephone user. For example, an industrial corporation may have a centrally located computer in which it is desired to make a large volume of data accessible to widely located managers or scientists or other professional employees. In the case of scientists, the data may be in any of a great variety of forms such as solutions to mathematical or hardware design equations having independent variables conveniently communicable to the computer 12 by operation of a digit or dial actuator 17 on the sending telephone 14. In the case of managers, the data may be related to current business operating results or current industry sales or to any of a great variety of business statistics which are relevant to the business decision making processes and which are continuously updated in the computer 12.

In other applications, computer time may be shared by a group of banks, hospitals, stockbrokers, small businesses, or other institutions or organizations for information input and/or retrieval. Similarly a commercially time shared computer could be operated for individual consumers in a particular region where the consumers have relatively small data processing needs in a popularly needed but otherwise infeasible information system. In all of the cited examples, the individual users can be widely located with data processing needs which are so small as to make the installation of special computer communications equipment at the user locations economically infeasible.

A data input system 18 for the computer 12 includes a decoding circuit 20 which is coupled to the receiver phone 16 by means of a conventional commercially available pickup coil 22. A suitable solenoid device 24, preferably actuated by the computer 12 or directly by the decoding circuit 20, can be employed to lift the telephone handset from the receiver phone 16 in response to the ringing signal when a call is made to the computer center. When the phone connection is completed, data can be communicated to and from the computer 12. In the alternative, the pickup coil 22 and the receiver phone 16 can be replaced by conventional telephone exchange circuitry which electrically completes incoming calls to the computer 12.

At the output of the decoding circuitry 20, an interrupt relay 26 is employed to produce input signals to the computer 12. Decoded phone digit signals operate the relay 26, and the data thus entered into the computer 12 is processed according to the preset data processing program.

Computer output data is processed through an output data system 28 including an audio playback unit 30 and a speaker 32. The audio playback unit 30 preferably includes a random access magnetic storage drum on which predetermined messages are recorded. The speaker 32 is located in proximity to the handset of the receiver telephone 16 so that the audio data can be communicated to the user of the sending telephone 14. The audio unit 30 is operative when the telephone user has submitted an inquiry to the computer 12, and is passive when the telephone user has simply submitted information for storage in the computer 12.

The decoding circuitry 20 operates in response to the switching signals produced by operation of the phone digit actuator or dial 17 after the phone connection has been completed. Dial signals then generated characteristically have high frequency content due to the circuit making and breaking action. Since telephone exchange audio circuitry typically has an upper frequency limitation of 2.5 kc., it may be desirable from the standpoint of telephone company acceptance to employ a filter (not shown) in the user phone 14 to reduce the high frequency content and the possibility of cross-talk through the audio circuitry.

In operation, an individual telephone subscriber, who is also a subscriber to the particular information system service provided by the computer 12 under a suitable subscription and billing system as required, calls the computer 12 from his remotely located phone 14 by operating the dial or other digit actuator 17. When the ringing connection is made through the intermediate telephone exchange or exchanges 34, the receiving phone 16 commences to ring and the phone handpiece is raised by the computer or decoder actuated solenoid 24. If special phone receiving equipment is installed at the computer site, the phone ringing signal may operate relays or the like to complete the connection. The special telephone equipment at the computer site can be adapted to provide for simultaneous reception of multiple incoming calls.

After the telephone-computer connection is made, the user operates the dial 17 to transmit digit information over the phone line in accordance with the predetermined coding arrangement. Incoming signals are detected by the pickup coil 22 and the decoding circuitry transmits only real digit signals as input signals to the interrupt relay 26 and the computer 12. In accordance with the preset code, the phone line digit information may simply represent information to be stored in the computer 12, or it may represent an inquiry for information already stored in the computer 12. In the latter case, the computer 12 processes the inquiry and operates the audio playback unit 30 to provide the reply information by means of audio playback through the phone 16 as previously described.

In the described process, the individual telephone subscriber obtains computer service simply by making use of his telephone substantially without any additional user equipment. In some cases, it may at most be necessary to use only an inexpensive filter circuit in the user telephone. The data communications process accordingly provides economic computer service for numerous and widely distributed users who have relatively small data processing needs.

Figure 4:
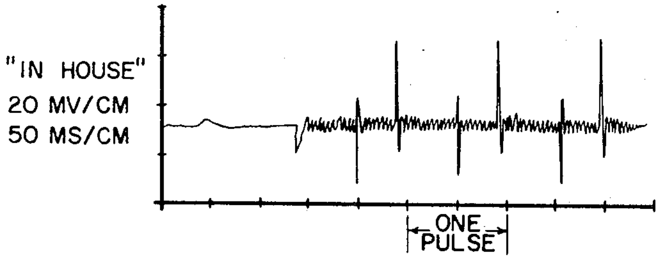
FIGURES 4–6 show characteristic telephone line signals received at a common point from certain surrounding sending points.
Figure 5:
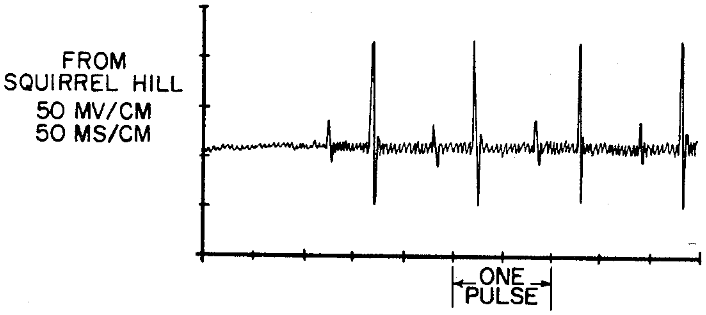
Figure 6:

In operating the system 10, it is necessary that the postconnection telephone line digit signals be decoded for entry to the computer 12. Survey studies have indicated that postconnection telephone digit signals vary greatly in amplitude and in appearance as received at a particular location from other locations. In FIGURES 4–6, there are shown representative waveforms for a dialed number as received at Churchill Borough, Pittsburgh, Pa. from a local phone, from a phone in the Squirrel Hill area of Pittsburgh, Pa., and from a phone in Allison Park, Pa.

In general, the curves of FIGURES 4–6 demonstrate amplitude variation and appearance variation of the digit waveform. Amplitude is fairly constant from any given point, but amplitude variation does occur from location to location and is apparently a function primarily of the number of exchanges between the sending and receiving point and not a function of distance per se. Thus, telephone digit signals received in Pittsburgh from the Boston metropolitan area were determined to have usable characteristics for decoding in the circuitry 20. Appearance variation from location to location is apparently due to a number of factors including differing transmission impedance conditions and reflection or other effects which result in irregular subsignals within the overall digit signal. Signal appearance or shape is usually fairly constant from any given location.

The time duration of each pulse signal in the overall waveform of each dial signal is fairly constant or is within a predetermined range of variation, and two subsignals characteristically appear in each pulse signal in the dial signal waveform independently of location. These facts provide sufficient intelligence for proper operation of the decoding circuitry 20. The object of the decoding circuitry 20 is to produce a single logic event or pulse for each pulse signal in any dialed digit signal received through the phone 16.

As shown in FIGURE 1, the decoding circuitry 20 includes a preamplifier 36 which full wave rectifies the AC signal detected by the pickup coil 22. The detected signal is caused by interruption of the standard DC telephone line voltage when the digit actuator 17 is operated. The particular digit dialed determines the number of interruptions and the number of pulse signals which form the overall digit waveform.

The preamplifier 36 is coupled to an automatic gain control amplifier 38 which adjusts the signals from all user locations to a common fixed amplitude level to eliminates substantially the processing of noise and stray signals, a threshold circuit 40 is coupled to the output of the AGC amplifier 38. In turn, the threshold output is coupled to a timing circuit 42 which initiates a timing period in response to a first subpulse or subsignal at the start of each pulse signal. The timing period has a duration related to the characteristic pulse signal time period and in this instance it is preset to be 90 milliseconds, which is less than the minimum experienced pulse signal time duration but more than the time required for the identifying features of the pulse signal to occur.

The threshold output is also applied to logic circuitry, i.e., to an inunt terminal of a logic gate circuit 44, which in turn is coupled through a NAND flip-flop 46 to the interrupt relay 26. To prevent interrupt relay operation by stray signals above the threshold level, the timer output 42 is connected to a delay circuit 48 which, in this instance, produces a delay of 30 milliseconds before applying a signal input to another input terminal of the logic gate 44. When signals from the threshold and delay circuits are simultaneously applied to the logic gate 44, the NAND flip-flop 46 is set and the interrupt relay 26 is operated. In particular, the logic gate 44 operates in response to a second subpulse or subsignal in each pulse signal after the gate becomes enabled by the delay circuit output. At the completion of the timing period, the flip-flop 46 is reset by the timer 42 as indicated by the reference character 50, and the interrupt relay 26 is deenergized. Thus, two subpulses, which are characteristic to all pulse signals in dialed digit waveforms, are required to energize the interrupt relay 26 and real dial pulse signals are effectively amplified and distinguished from noise and stray and other false signals by the decoding circuitry 20.

In this instance, the pre-connection ringing signal produces a high amplitude output from the preamplifier 36. At the high amplitude ringing output, the gain of the AGC amplifier 38 is substantially lowered. After ringing is detected in the decoder 20 and as the solenoid 24 is operated, a reset circuit 52 is operated to reset the gain of the AGC amplifier 38 to a high level for lower amplitude postconnection dial signals.

Figure 2:
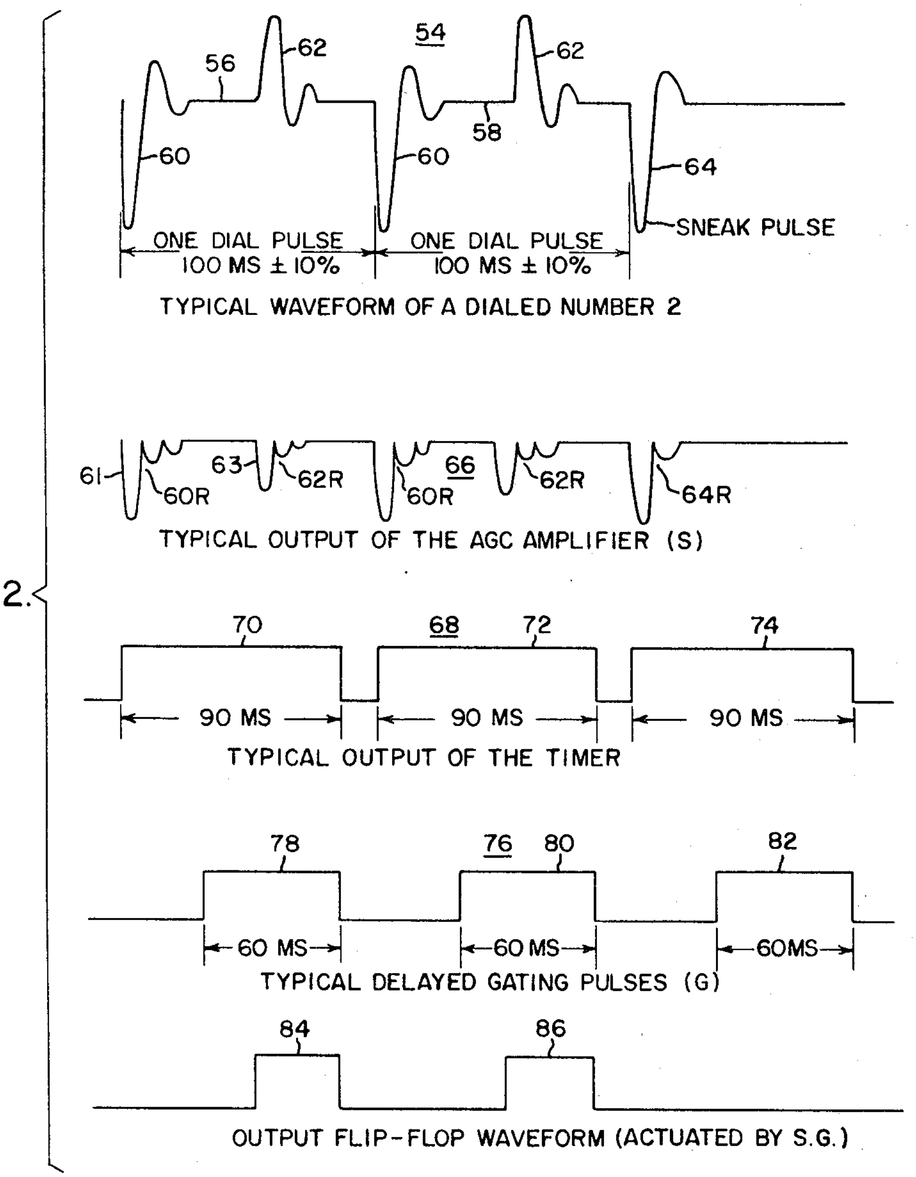
FIGURE 2 shows a series of significant waveforms which typically exist at various points of the system shown in FIG. 1.

In FIGURE 2, there are shown typical decoding circuit waveforms generated while processing digit pulse signals in the waveform for a dialed numeral two. As indicated by the reference character 54, the overall dialed digit waveform includes successive pulse signals 56 and 58, each of which comprises subsignals or subpulses 60 and 62. A sneak or reflection pulse 64 often follows the last complete pulse in a dialed digit waveform. Other dialed waveforms have successive signals or pulses corresponding in number to the dialed number. The individual subpulses or subsignals 60 and 62 can vary greatly in shape and amplitude from location to location as previously described.

After detection and amplification, the dialed waveform for the numeral two acquires the form indicated by the reference character 66. The subsignals 60 and 62 and the sneak signal 64 are then amplified and full wave rectified as indicated by the reference characters 60R, 62R and 64R.

The timer output waveform is generally indicated by the reference character 68 and it includes successive pulses 70, 72 and 74 initiated respectively by the successive subsignals 60R and the sneak signal 64R. Each timer output pulse has a duration of 90 milliseconds which is sufficient in time to encompass the two subsignals included in each individual pulse signal produced by circuit making and breaking action of the phone dial actuator 17. Further, the timing period is less than that which would result in overlap with the next succeeding dial pulse.

The delay circuit 48 produces an output waveform as indicated by the reference character 76. It includes successive pulses 78, 80 and 82 which are initiated, respectively, 30 milliseconds after the initiation of the timer pulses 70, 72 and 74. The delay is preset to assure completion of the first subsignal in each dial pulse before the delay pulse 78, or 80 or 82 is initiated.

Since the dial pulses 56 and 58 represent real digit pulses, they cause output pulses 84 and 86 to be produced by the flip-flop 46 for operation of the interrupt relay 26. The flip-flop pulses 84 and 86 occur after the logic gate 44 is gated by the delay circuit pulses 78 and 80 and respecively after the subsignals 62 successively occur. On the other hand, the sneak signal 64 has no effect on the flip-flop 46 since there is no second follow-up signal to gate the logic circuit 44 and set the flip-flop 46 during the gating time measured by the delay circuit pulse 82. A mistaken interpretation of the sneak pulse 64 as another dial pulse is thus avoided.

Figure 3:
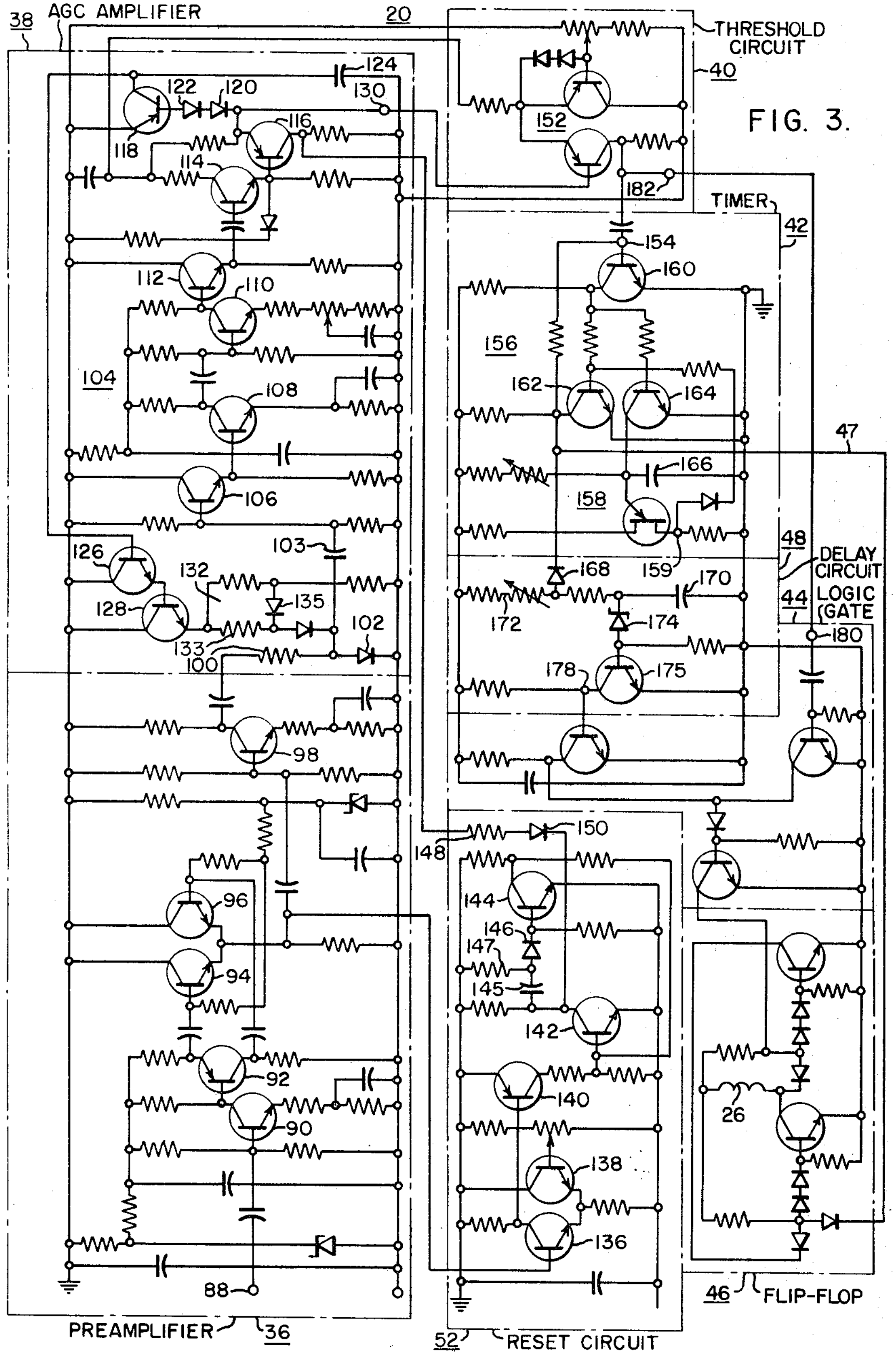
FIGURE 3 shows a more detailed schematic diagram of circuitry employed in the system of FIG. 1.

The preferred embodiment of the decoding circuitry 20 is shown in FIGURE 3 and it will be described here only to the extent necessary for a fuller understanding of the invention. Input signals from the pickup coil 22 are applied to a preamplifier input terminal 88 and capacitively coupled to the base of a transistor 90 which operates as an AC amplifier in raising the signal level to a value suitable for rectification. The collector output of the amplifier transistor 90 is coupled to the base of a phase splitter transistor 92 which, in turn, has its emitter and collector outputs capacitively coupled to the bases of emitter follower transistors 94 and 96. The output from the emitter follower transistors 94 and 96 is a full wave rectified noninverted signal which is capacitively coupled to the base of another AC amplifier transistor 98. The preamplifier collector output from the transistor 98 is capacitively coupled to a series circuit including a current limiting resistor 100 and a non-linear circuit element or gain regulating diode 102 at the input of the AGC amplifier 38. The resistor 100 is preferably selected in value to limit the input signal current through the diode 102 within a range which aids in preventing non-linear distortion. To minimize non-linear distortion at any particular bias point of operation in the AGC diode 102, the AC peak current in a sample AGC diode and amplifier circuit was held to about $\frac{1}{10}$ of the value of the DC current through the AGC diode.

Since the input signal to the AGC amplifier 38 is full wave rectified, a smaller portion of the diode characteristic is used and a larger range of AC phone line signals can be accommodated without nonlinear distortion. Further, as is evident from FIG. 2, decoding is always initiated on the first subpulse front 61 or 63 irrespective of its polarity. Faster response is thus obtained. Since both polarities initiate AGC response, a further advantage lies in the fact that the AGC amplifier output level is determined by the subsubpulse of greatest amplitude.

In the AGC amplifier 38, an input signal developed across the diode 102 is applied to the input of a high gain amplifier 104 including transistors 106, 108, 110 and 112. The transistor 106 is connected as an emitter follower to provide high input impedance and the transistor 112 is connected as an emitter follower to provide low output impedance. The high gain amplifier output is capacitively coupled to an emitter follower transistor 114 having a ground biased base electrode. In turn, the emitter follower transistor 114 is directly coupled to another emitter follower transistor 116 so as to compensate for the base-emitter drop of the transistor 114 and reestablish the quiescent point at ground potential.

The emitter output of the emitter follower transistor 116 is connected to amplifier output terminal 130 and further is directly coupled to another transistor 118 through a pair of diodes 120 and 122 which, when forward biased at threshold value, cause an automatic gain control feedback capacitor 124 to be positively charged through the transistor 118. The charging rate of the capacitor 124 is thus determined by the emitter voltage amplitude at the transistor 116 when the diodes 120 and 122 are forward biased.

Automatic gain control voltage from the capacitor 124 is applied to the base of a transistor 126 which is paired with another transistor 128 to form a Darlington amplifier in the feedback loop. Feedback control produced by the Darlington transistor 128 causes more bias current to flow through the input AGC diode 102 when the voltage across the AGC capacitor 124 and hence when the amplifier output voltage increases. The dynamic impedance of the AGC diode 102 is thereby decreased to cause the input and output voltages of the AGC amplifier 38 to decrease.

To extend the input signal range of the automatic gain control amplifier 38, a non-linear circuit network 132 is employed to couple the collector output of the Darlington transistor 128 and the AGC diode 102. It provides a more uniform AGC feedback loop gain with the non-linear AGC diode resistance characteristic.

In the non-linear network, 132, DC bias current through the AGC diode 102 is determined at low input signal levels by resistor 133 and the voltage across the AGC capacitor 124. At higher signal levels, more current flows through the network 132 since diode 135 becomes forward biased to produce additional bias current flow through the AGC diode 102.

In operation, a call to the computer 12 from a user at a particular location causes the reset circuit 52 to discharge the AGC capacitor 124 and set the AGC amplifier 38 at maximum gain. The first subsequent dialed digit causes successive pulses at the input of the AGC amplifier 38 which are amplified and in turn cause the AGC capacitor 124 to charge until the amplifier gain is reduced to the point required for the incoming pulses to be amplified to the predetermined regulated output voltage at the terminal 130. The dialing of a single digit such as "5" or "0" can be sufficient to result in the gain adjustment required for the signal level obtained from the caller's location. Thereafter, and during the same call, the AGC feedback circuitry usually operates to produce only minor gain adjustments.

Application of a rectified signal across the nonlinear circuit element or diode 102 avoids the necessity of having separate feedback circuits for positive and negative peaks. Better gain regulation is thus realized since any feedback change in the bias level of the AGC diode 102 produces a transient effect on the AGC amplifier output through coupling capacitor 103. The transient effect is separate and opposite from the effect produced by the new steady state AGC diode bias level. Cross working feedback effects from separate positive and negative feedback circuits are thus avoided by use of a single feedback circuit and by application of rectified input signals to the diode 102.

In the data shown in FIGURES 4–6, the telephone signal level varies from 50 millivolts peak to peak to 0.7 millivolt peak to peak. The AGC amplifier 38 provides good gain regulation through an input voltage range of better than 80:1 and therefore adequately processes the illustrated signals.

Once the AGC amplifier 38 has been operated by signals of large amplitude and the slowly discharging AGC capacitor 124 has been charged to a certain voltage level, an abruptly applied and substantially smaller input signal is not processed with sufficient gain to reach the normal amplifier output level. Thus, when the input level changes as a result of a change in the user's calling location, which is always indicated by a new ringing signal, the AGC amplifier 38 and specifically the AGC capacitor 124 is reset to maximum gain following the high level ringing signal. In the reset circuit 52, a differential amplifier including normally cutoff transistor 136 and normally conducting transistor 138 is provided with a potentiometer adjustable threshold and is operated by a signal through conductor 140 from the preamplifier 36. Alternately, a signal derived from the leading edge of the computer initiated voltage signal used to actuate the telephone solenoid 24 can be used as an input to conductor 140.

When the computer 12 is called, the signal at the base of the normally cut off transistor 136 has sufficient amplitude to bias the base-emitter junction in the forward direction. The transistor 136 then becomes conductive along with transistors 140 and 142. Transistor 144 becomes blocked by a reverse biased diode 146 which is coupled to the collector output of the transistor 142 by means of a capacitor 145. The AGC capacitor 124 is connected to the collector of the transistor 142 through a current limiting resistor 148 and a diode 150 and discharges through the transistor 142 when it becomes conductive. When the transistor 144 is blocked, feedback from its collector to the base of the transistor 142 keeps the transistor 142 conducting until the capacitor 145 charges sufficiently through resistor 147 to forward bias diode 146 and cause the transistor 144 to return to its original conducting state. The circuit time constant is preselected to provide sufficient time for the AGC capacitor 124 to be discharged and provide the AGC amplifier reset.

In the threshold circuit 40, a differential transistor amplifier 152 has its input coupled to the output terminal 130 of the AGC amplifier 38. The threshold circuit output is capacitively coupled to an input terminal 154 of the timer 42 and transmits signals from the AGC amplifier 38 only when the amplifier output signal level is above a predetermined adjustable level.

The timer circuit 42 includes a flip-flop 156 and a unijunction transistor 158. Transistor 160 is normally blocked and transistors 162 and 164 are normally conducting. When the output of the AGC amplifier 38 exceeds the threshold level set by the threshold circuit 40, as in response to the first subsignal of a dial pulse signal, the transistor 160 becomes conductive and the transistors 162 and 164 become nonconductive. A capacitor 166 then begins to charge as the timing period is initiated. The termination of the timing period occurs when the capacitor voltage reaches the characteristic unijunction transistor breakdown voltage, and a pulse is then produced at unijunction transistor base 159 which is fed back to the base of the transistor 162 to reset the timer.

When the transistor 162 is switched to a nonconductive state at the beginning of the timing period, a diode 168 is reverse biased and a capacitor 170 starts charging in the delay circuit 48. After a time delay which is adjustable by means of a potentiometer 172, Zener diode 174 conducts current and a transistor 175 is switched to its conductive state. A delayed timing pulse, inverted with respect to waveform 80, is then applied at an input terminal 178 of the logic gate 44. The delayed timing pulse continues until the termination of the ongoing timing period. If another dial subpulse is amplified by the AGC amplifier 38 to the threshold level during the balance of the timing period, the logic gate 44 is operated through input terminal 180 which is coupled to an output of the threshold circuit 40 as indicated by the reference character 182. When the logic gate 44 is operated, a flip-flop 46 of standard commercial design is set to actuate the interrupt relay 26 as previously described. At the end of the timing period, the flip-flop 46 is reset by the timer 42 as indicated by the reference character 47.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A process for communicating data, the steps of said process including using the circuit interrupt digit actuator of a telephone to make a connection through the telephone system to telephone receiving equipment associated with a digital computer, sending digital data to the receiving equipment by means of the digit actuator, decoding recevied telephone line signals which are characterized with a pair of subpulse signals to distinguish real digit actuator pulse signals from reflective and noise and other false signals including false single subpulse signals characteristically appearing after each digit waveform, and coupling the decoded signals to the computer.

2. A decoding circuit for a telephone-computer communications system, said circuit comprising means for amplifying with gain regulation various amplitude digit actuator pulse signals from various locations in the telephone system, means for decoding the amplified telephone line signals to distinguish real digit actuator pulse signals from reflective and noise and other false signals, said amplifying means including a rectifying preamplifier and an automatic gain control amplifier having an input non-linear circuit element coupled to the output of said preamplifier, said automatic gain control amplifier further including a feedback loop coupled to said non-linear circuit element.

3. A decoding circuit as set forth in claim 2, wherein said non-linear circuit element is a diode and wherein said feedback loop is coupled to said diode through a non-linear circuit to provide substantially constant gain over a wide range of amplifier input signal voltages.

4. A decoding circuit as set forth in claim 2, wherein said decoding means includes circuitry arranged to distinguish real digit actuator pulse signals characterized with a pair of subpulse signals from false single subpulse signals characteristically appearing after each digit waveform and from noise and other false signals.

5. A decoding circuit as set forth in claim 2, wherein said decoding means includes a timing circuit responsive to a predetermined threshold amplified signal level to initiate a timing period of predetermined duration following the first subsignal of a decoding circuit input pulse signal, a delay circuit responsive to said timing circuit to generate an output a predetermined delay time after the start of the timing period, and logic circuit means coupled to said amplifier means and said delay circuit to generate an output in response to decoding circuit input pulse signals having another subsignal occurring after the first subsignal and after the delay time has transpired.

References Cited

UNITED STATES PATENTS

| | | | |
|---|---|---|---|
| 3,009,058 | 11/1961 | Bodez | 325—326 |
| 3,347,988 | 10/1967 | Marill et al. | |

ROBERT L. GRIFFIN, *Primary Examiner.*

J. A. BRODSKY, *Assistant Examiner.*

U.S. Cl. X.R.

325—326; 330—29